US012812196B2

(12) United States Patent
Harijan et al.

(10) Patent No.: US 12,812,196 B2
(45) Date of Patent: Nov. 24, 2026

(54) METHOD AND APPARATUS FOR REDIRECTING PORTIONS OF CONTENT TO ALTERNATE COMMUNICATION CHANNELS

(71) Applicant: Adeia Guides Inc., San Jose, CA (US)

(72) Inventors: Kuppappa Harijan, Challaghatta (IN); Madhusudhan Srinivasan, Bangalore (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 19/250,641

(22) Filed: Jun. 26, 2025

(65) Prior Publication Data

US 2025/0324122 A1 Oct. 16, 2025

Related U.S. Application Data

(63) Continuation of application No. 17/948,950, filed on Sep. 20, 2022, now Pat. No. 12,368,916, which is a continuation of application No. 17/389,011, filed on Jul. 29, 2021, now Pat. No. 11,477,504, which is a continuation of application No. 16/408,244, filed on May 9, 2019, now Pat. No. 11,109,087.

(51) Int. Cl.
*H04N 21/266* (2011.01)
*H04N 21/61* (2011.01)

(52) U.S. Cl.
CPC ........... *H04N 21/266* (2013.01); *H04N 21/61* (2013.01)

(58) Field of Classification Search
CPC .. H04N 21/266; H04N 21/61; H04N 21/2353; H04N 21/434; H04N 21/44008; H04N 21/4348; H04N 21/4532; H04N 21/4316; H04N 21/25891; H04N 21/4622; H04N 21/4722; H04N 21/812; H04N 21/482; H04N 21/2668; H04L 51/10; H04L 51/32; H04L 67/306; H04L 51/046
USPC .......................................................... 725/116
See application file for complete search history.

(56) References Cited

U.S. PATENT DOCUMENTS

| | | | | |
|---|---|---|---|---|
| 2011/0283306 A1* | 11/2011 | Davis | ............... | H04N 21/43637 725/9 |
| 2012/0210345 A1* | 8/2012 | Wong | .................. | H04N 21/478 725/25 |
| 2014/0089967 A1* | 3/2014 | Mandalia | ......... | H04N 21/25891 725/34 |
| 2015/0149179 A1* | 5/2015 | Korbecki | ................ | G10L 13/00 704/260 |
| 2015/0373419 A1* | 12/2015 | Skokna | ........... | H04N 21/42224 725/43 |
| 2019/0306543 A1* | 10/2019 | Gang | .................. | H04N 21/234 |

* cited by examiner

*Primary Examiner* — Cynthia M Fogg
(74) *Attorney, Agent, or Firm* — HG LAW LLP

(57) ABSTRACT

Systems and methods for displaying primary content without any overlaid secondary content, and instead transmitting the secondary content to the viewer as a message through another communication channel. For example, a news banner is removed from display on a viewer's television, and the text of the news banner is encapsulated in a message sent to the viewer's primary social media account. In this manner, the viewer may watch the primary content uninterrupted by the secondary content, and is thus presented with fewer distractions and a potentially more enjoyable viewing experience.

20 Claims, 6 Drawing Sheets

METHOD AND APPARATUS FOR REDIRECTING PORTIONS OF CONTENT TO ALTERNATE COMMUNICATION CHANNELS

CROSS-REFERENCE TO RELATED APPLICATIONS

This application is a continuation of U.S. patent application Ser. No. 17/948,950, filed Sep. 20, 2022, which is a continuation of U.S. patent application Ser. No. 17/389,011, filed Jul. 29, 2021, now U.S. Pat. No. 11,477,504, which is a continuation of U.S. patent application Ser. No. 16/408,244, filed May 9, 2019, now U.S. Pat. No. 11,109,087, the disclosures of each application are incorporated by reference in their entireties.

BACKGROUND OF THE INVENTION

Embodiments of the disclosure relate generally to electronic media entertainment systems. More specifically, embodiments of the disclosure relate to electronic media entertainment systems for redirecting portions of content to alternate communication channels.

SUMMARY

Contemporary electronic content delivery systems are capable of overlaying two different types of content for simultaneous display to viewers. Typical examples include the broadcast of a business-related show along with a stock ticker displayed as a banner below the show, and a sports channel displaying a sporting match along with overlaid scores of that match or a different one. A further example is a breaking news headline banner displayed over current programming when important events occur.

The ability to overlay content increases the amount of information delivered to the viewer, and sometimes delivers relevant and timely information. However, this content overlay also suffers from certain drawbacks. In particular, content overlay can be distracting to the viewer when he or she is not interested in the overlaid content or is primarily interested in uninterrupted display of the program currently being played. Such unwanted distractions can detract from a user's viewing experience.

Accordingly, to overcome the problems and limitations of electronic content overlay, systems and methods are described herein for a computer-based process that prevents content from being overlaid on another program, and instead transmits it as a message to a separate electronic communication channel that may be personalized to the viewer. As one example, electronic banner news intended for overlay on a viewer's television may instead be converted to a message that is sent to the viewer's most commonly used social media account. In this manner, viewers are subjected to fewer distractions when viewing programs of interest, while also receiving banner information in a format that allows them to peruse it at their convenience.

To carry out this process, a content direction device is placed between end user content consumption devices and content sources. Content is streamed or otherwise transmitted to the content direction device, which removes any banner text from the content and forwards the content to the end user's display device. The content direction device converts the banner text into a message that is sent to the user via another communication channel, such as a social media account of the user.

In particular, the content direction device may receive a content stream containing both primary content, or the content to be displayed, and secondary content, such as a news banner, stock ticker, or the like. As above, the secondary content is originally intended for concurrent display alongside the primary content. Instead, the content direction device determines whether the user is likely to be interested in the subject matter of the secondary content and, if so, sends the secondary content to a different communication channel of the user. More specifically, the content direction device determines the subject matter of the secondary content and compares it to preferences found in a user profile. If the secondary content matches the preferences of the user profile, then it is likely that the subject matter of the secondary content is something the user will be interested in. The secondary content is thus transmitted to a communication channel associated with the user while the primary content is, or continues to be, transmitted to the user's display device.

The text or other information of the secondary content can be encapsulated in a message and sent to any communication channel of the user. That is, the communication channels of the user may be any electronic communication channels. For example, the communication channel may be any social media account of the user through which he or she can receive messages. As another example, the communication channel may be a short message service (SMS) channel, electronic mail, or the like.

Furthermore, the communication channel can be chosen from among several different communication channels of the content viewer. As one example, the viewer's user profile may list the communication channels that the viewer has used, as well as associated information such as the frequency with which the viewer uses each channel. The appropriate communication channel may then be selected from among these listed channels. For instance, the channel that the viewer accesses with greatest frequency, or the channel that the viewer has designated as a preferred channel, may be selected.

User interest in the subject matter of the secondary content can be estimated in a number of ways. Parameters characterizing the subject matter of the secondary content may be determined by, for example, retrieving such parameters from metadata of the secondary content. These parameters may then be compared to corresponding preference parameters listed in a user profile. Such parameters can include, for example, categories such as content genre, producer name, the names of actors or other people appearing in the content, content title, and content provider(s). Any such categories, or any other parameters, may be used.

Any number of such parameters may also be used when carrying out the comparison to a user profile. A match may be determined by comparing only a single parameter to the preferences listed in the user profile. Alternatively, multiple parameters may be determined and compared. These multiple parameters may each be compared to various preferences of a user profile. A match may then be determined in any manner, such as by a predetermined threshold match with user profile parameters. This threshold may be any manner of threshold, such as a specified minimum number of matches, matches with at least a predetermined subset of parameters, or the like.

Once a match is determined, the various parameters of the secondary content may also be saved to the user profile to update the profile's preferences. In this manner, the viewer profiles may be continuously updated to reflect viewers' latest content preferences. Similarly, once a communication channel is selected for transmitting the secondary content to the user, the identity of this communication channel may also be stored in the user profile. In this manner, the system may keep more accurate track of which communication channels are most commonly or frequently used.

It is noted that the communication channel may be a channel executed by any computer-based application. As such, the channel may relay messages to any device used by the viewer. In this manner, secondary content can be sent to a different device than that on which the viewer is watching the primary content. Thus, for example, the content direction device may transmit the primary content, such as a television program, to the viewer's television, while transmitting the secondary content as a social media message to the viewer's cellular phone or tablet.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for removing secondary content from display over primary content, instead transmitting the secondary content as a message through a different communication channel. Content intended for display on a viewer's device may have primary content such as a television program, and secondary content such as a breaking news banner or stock ticker meant for overlay upon the primary content. Only the primary content is sent to the viewer's display device, while the secondary content is encapsulated in a message and sent to a different communication channel such as a social media account of the viewer. In this manner, the viewer may watch the primary content uninterrupted by the secondary content, and is thus presented with fewer distractions and a potentially more enjoyable viewing experience.

Figure 1:
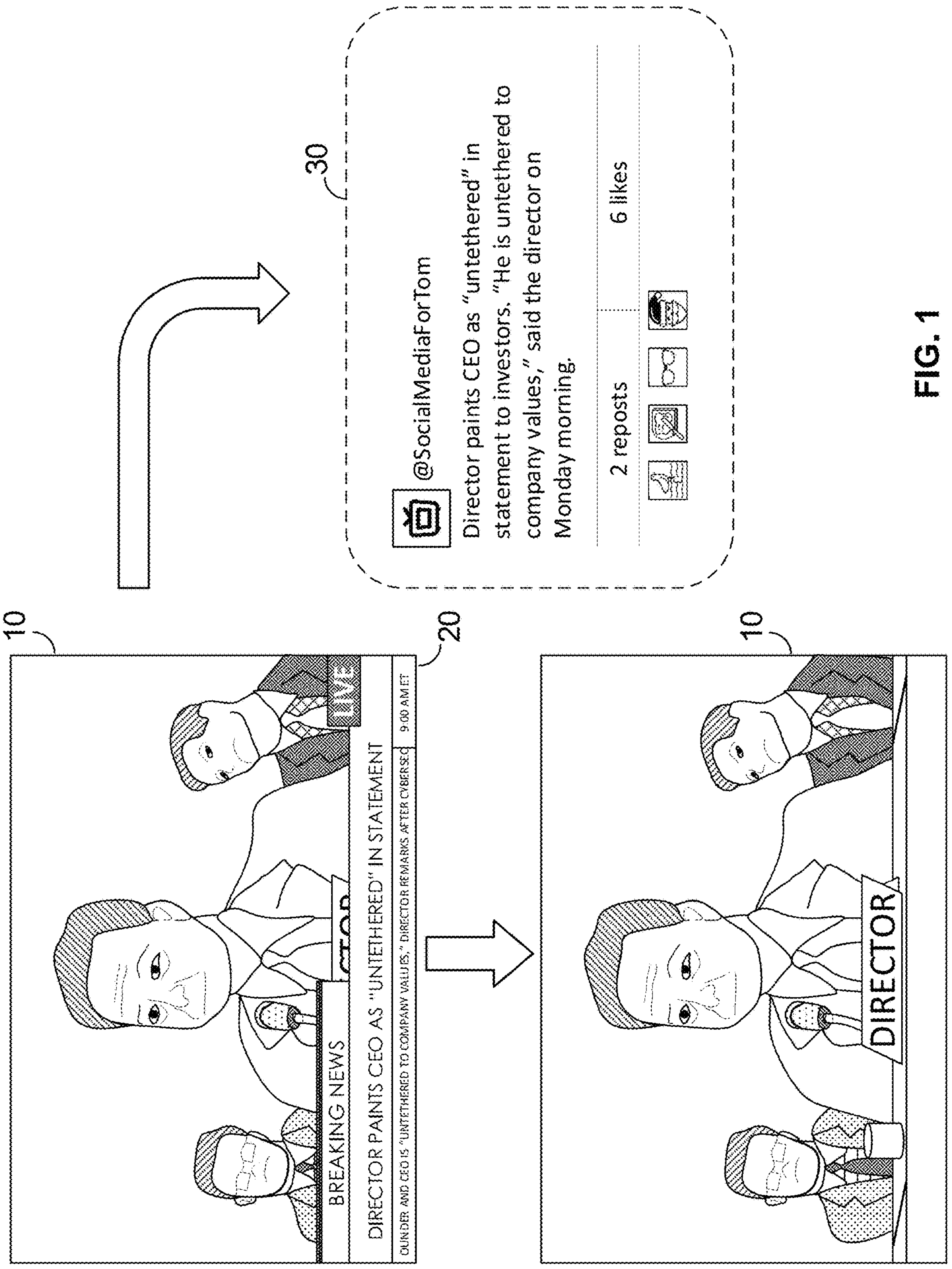
FIG. 1 illustrates an exemplary process of redirecting portions of content to alternate communication channels in accordance with embodiments of the disclosure.

FIG. 1 illustrates an exemplary process of redirecting portions of content to alternate communication channels in accordance with embodiments of the disclosure. Here, a television program is broadcast or streamed to a viewer. The program as originally intended to be displayed is a news program that contains both a primary image 10 and a secondary image 20. In this case, the primary image 10 is a live interview with an interview subject, and the secondary image 20 is a breaking news banner with text describing the interview subject and some of his interview statements. The secondary image 20 is overlaid on the bottom portion of the primary image 10, partially obscuring it. Furthermore, the secondary image 20 may contain scrolling text or may otherwise change with time, and often contains bright colors meant to command the viewer's attention. The secondary image 20 may thus be distracting to viewers of primary image 10, reducing their ability to focus on primary image 10 and compromising their viewing experience.

Accordingly, embodiments of the present disclosure remove the secondary image 20 from display, so that it is no longer displayed alongside the primary image 10. The program as actually displayed is shown in the lower left-hand image of FIG. 1, with the primary image 10 being displayed on, for example, the viewer's television as the only image shown, i.e., with the secondary image 20 removed. The secondary image 20 is thus not overlaid on primary image 10. Instead, the text of the secondary image is encapsulated in a message 30 of the viewer's primary social media account and sent to the viewer's phone or tablet, rather than being displayed on the viewer's television. In this manner, secondary images 20 are sent as separate messages 30 to the viewer instead of being displayed on top of the primary image 10, and may thus be much less intrusive and distracting.

Figure 2:
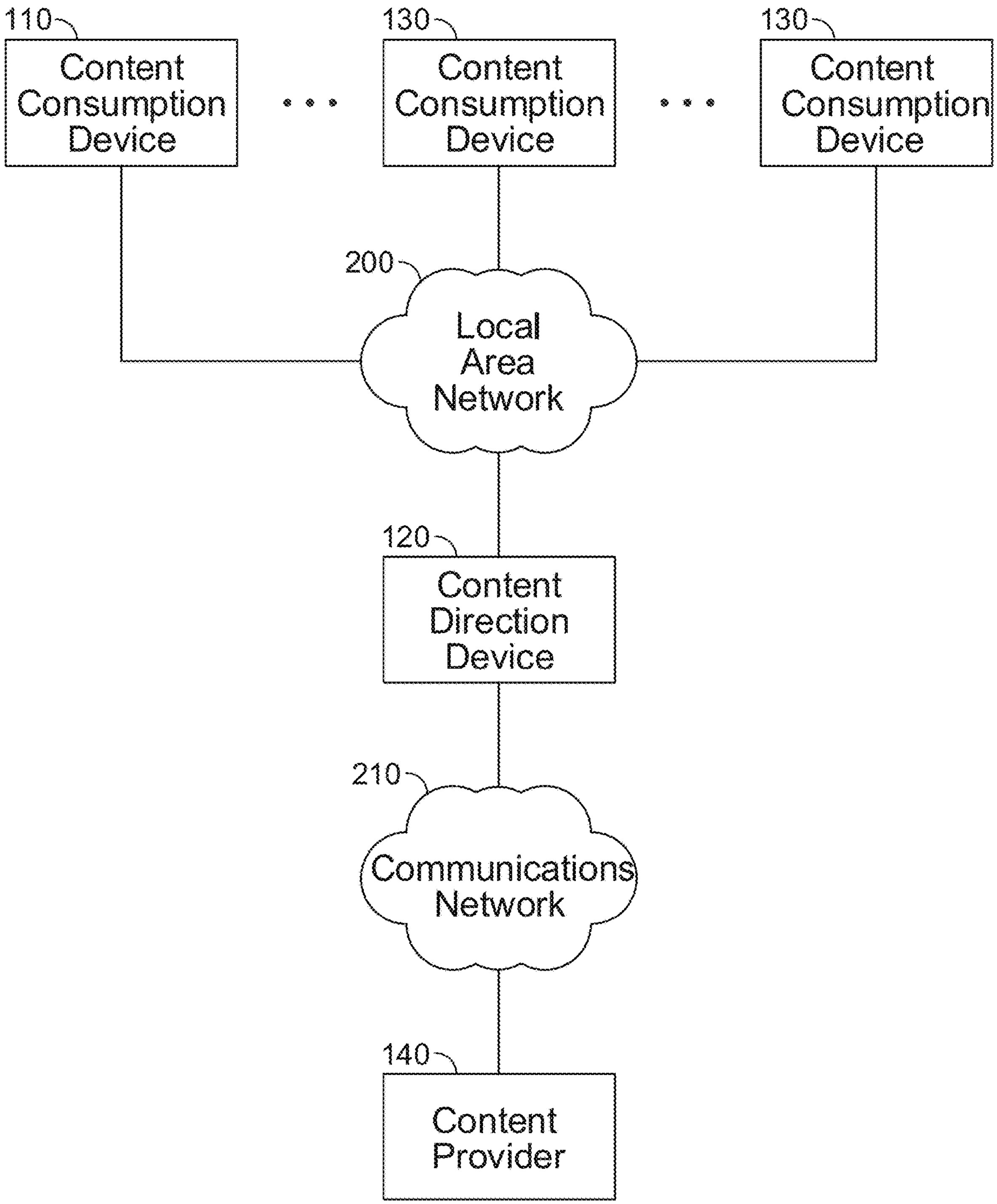
FIG. 2 is a block diagram illustration of a system for implementing the process of FIG. 1.

FIG. 2 is a block diagram representation of a system for implementing the process of FIG. 1, presented for further illustration. Any number of content consumption devices 110 and 130 may be in communication with content direction device 120 through, for example, a local area network 200. The content direction device 120 is in electronic communication with content provider 140 through communications network 210. As one example, the content consumption devices 110 and 130, local area network 200, and content direction device 120 may all be situated within a local area, e.g., within various rooms of a home or office. The content provider 140 may be a remotely located server at a content provider site, and the communications network 210 may be the public Internet. Alternatively, the content provider 140 may be situated within the local area and may be, for example, a local content storage and streaming application on a local computer including any of the above computing devices, or even a storage and display application within the content direction device 120 itself. Multiple content providers 140 may be in communication with content direction device 120 through communications network 210.

A user may be watching a show on first content consumption device 110, at which point the content provider 140 is providing a stream of the show through communications network 210 to content direction device 120. The content direction device 120 in turn receives this stream and directs it to device 110 over local area network 200. When another user requests another show or other stream on one of the second content consumption devices 130, the content direction device 120 receives the stream from one content provider 140 and directs the stream to the second content consumption device 130. In this manner, content may be streamed to multiple different devices 110, 130. The content direction device 120 directs primary content to the appropriate devices 110, 130. When secondary content is also streamed, the content direction device 120 directs it instead to alternate communication channels where it may be delivered to viewers as messages. Delivery may be to another device of the viewer, such as another device 110, 130.

Figure 3:
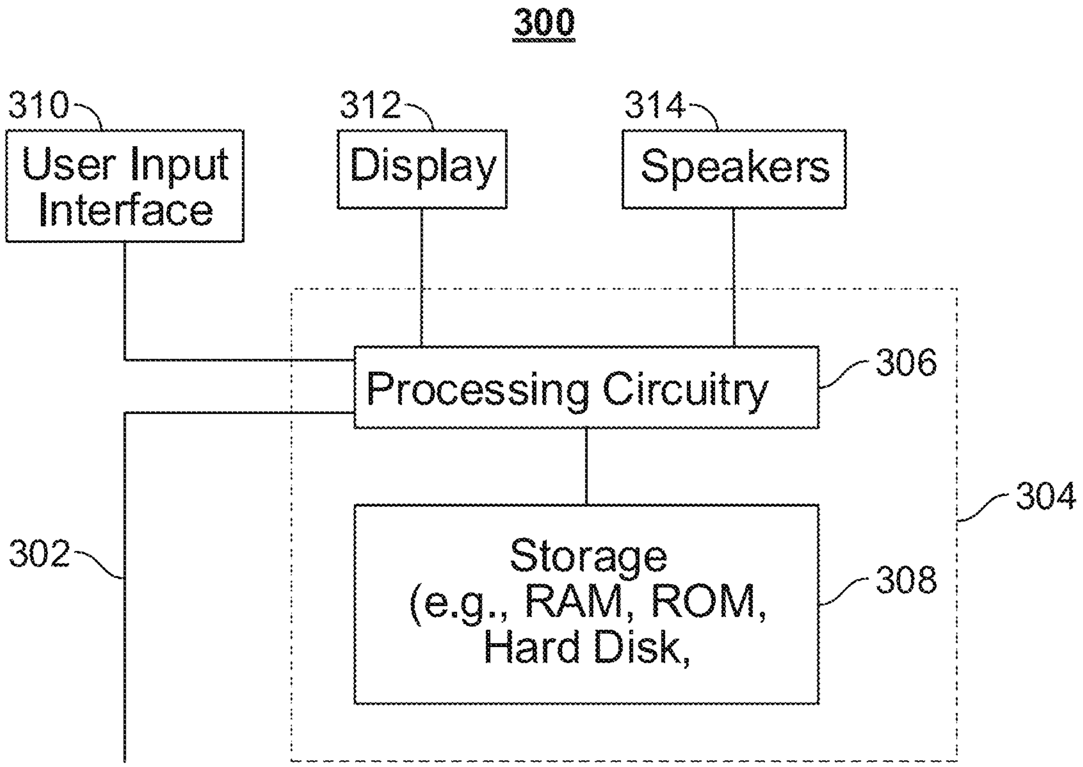
FIG. 3 is a generalized embodiment of illustrative content consumption devices constructed for use according to embodiments of the disclosure.

The content consumption devices 110, 130 may be any devices capable of receiving streamed content and displaying the content for users. For example, content consumption devices 110, 130 may be digital TVs, laptop computers, smartphones, tablet computers, or the like. FIG. 3 shows a generalized embodiment of an illustrative user equipment device 300 that may serve as a content consumption device. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers 140 to stream and display content.

Control circuitry 304 may thus include communications circuitry suitable for communicating with a content provider 140 server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
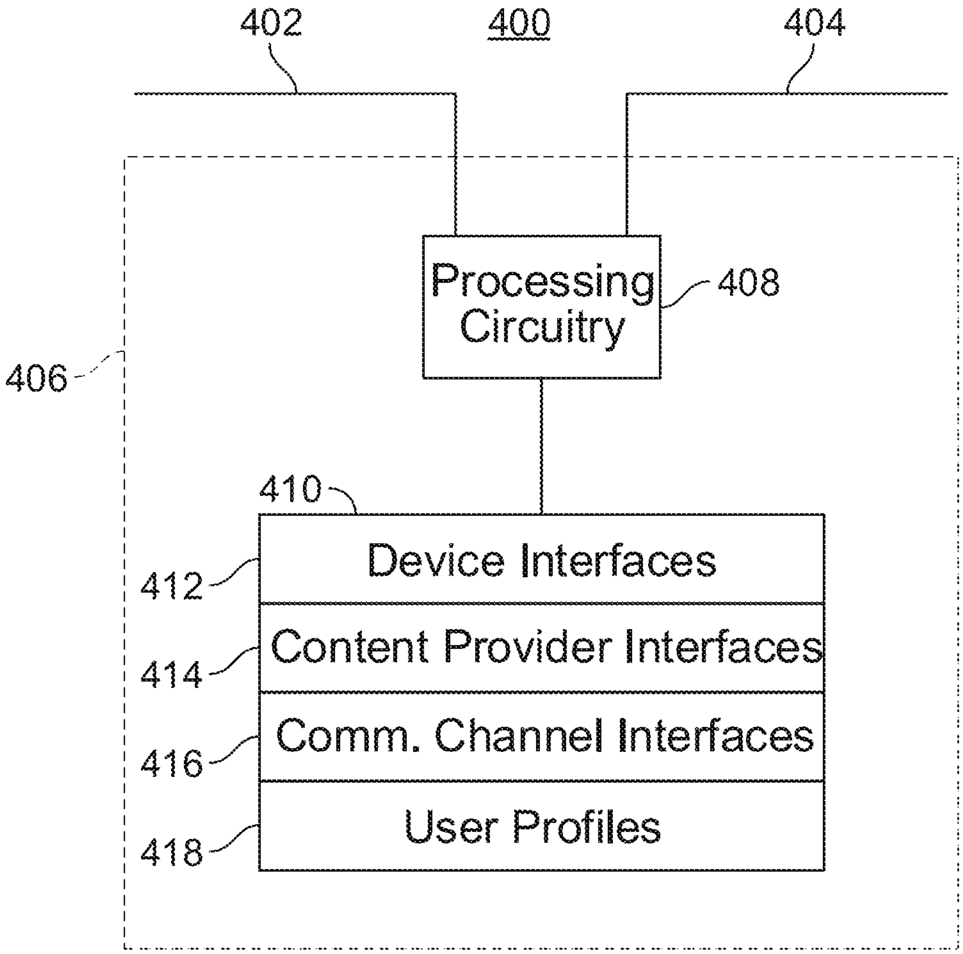
FIG. 4 is a generalized embodiment of an illustrative content direction device constructed for use according to embodiments of the disclosure.

FIG. 4 is a generalized embodiment of an illustrative content direction device 120 constructed for use according to embodiments of the disclosure. Here, device 400 may serve as a content direction device. Device 400 may receive content and data via I/O paths 402 and 404. I/O path 402 may provide content and data to the various content consumption devices 110 and 130, while I/O path 404 may provide data to, and receive content from, one or more content providers 140. Like the user equipment device 300, the device 400 has control circuitry 406 which includes processing circuitry 408 and storage 410. The control circuitry 406, processing circuitry 408, and storage 410 may be constructed, and may operate, in similar manner to the respective components of user equipment device 300.

Storage 410 is a memory that stores a number of programs for execution by processing circuitry 408. In particular, storage 410 may store a number of device interfaces 412, content provider interfaces 414, communication channel interfaces 416 for communicating with various applications that provide communication channels, and user profiles 418. The device interfaces 412 are interface programs for handling the exchange of commands and data with the various content consumption devices 110, 130. Content provider interfaces 414 are interface programs for handling the exchange of commands and content streams with various content providers 140, and are programmed to exchange commands and content similar to a corresponding application program on a content consumption device 110, 130. A separate interface 414 may exist for each different content provider 140 that has its own format for commands or content. Communication channel interfaces are interface programs for handling the exchange of commands and data with various communication channel application programs. A separate interface 416 may exist for each different communication channel application program that the content direction device 120 may interface with. User profiles 418 are stored user profiles corresponding to viewers or users of the content consumption devices 110, 130.

The device 400 may be any electronic device capable of receiving content streams and transferring them to one or more content consumption devices 110, 130. For example, the device 400 may be a networked in-home smart device connected between a home modem and various content consumption devices 110, 130. The device 400 may alternatively be a laptop computer or desktop computer configured as above.

Figure 5:
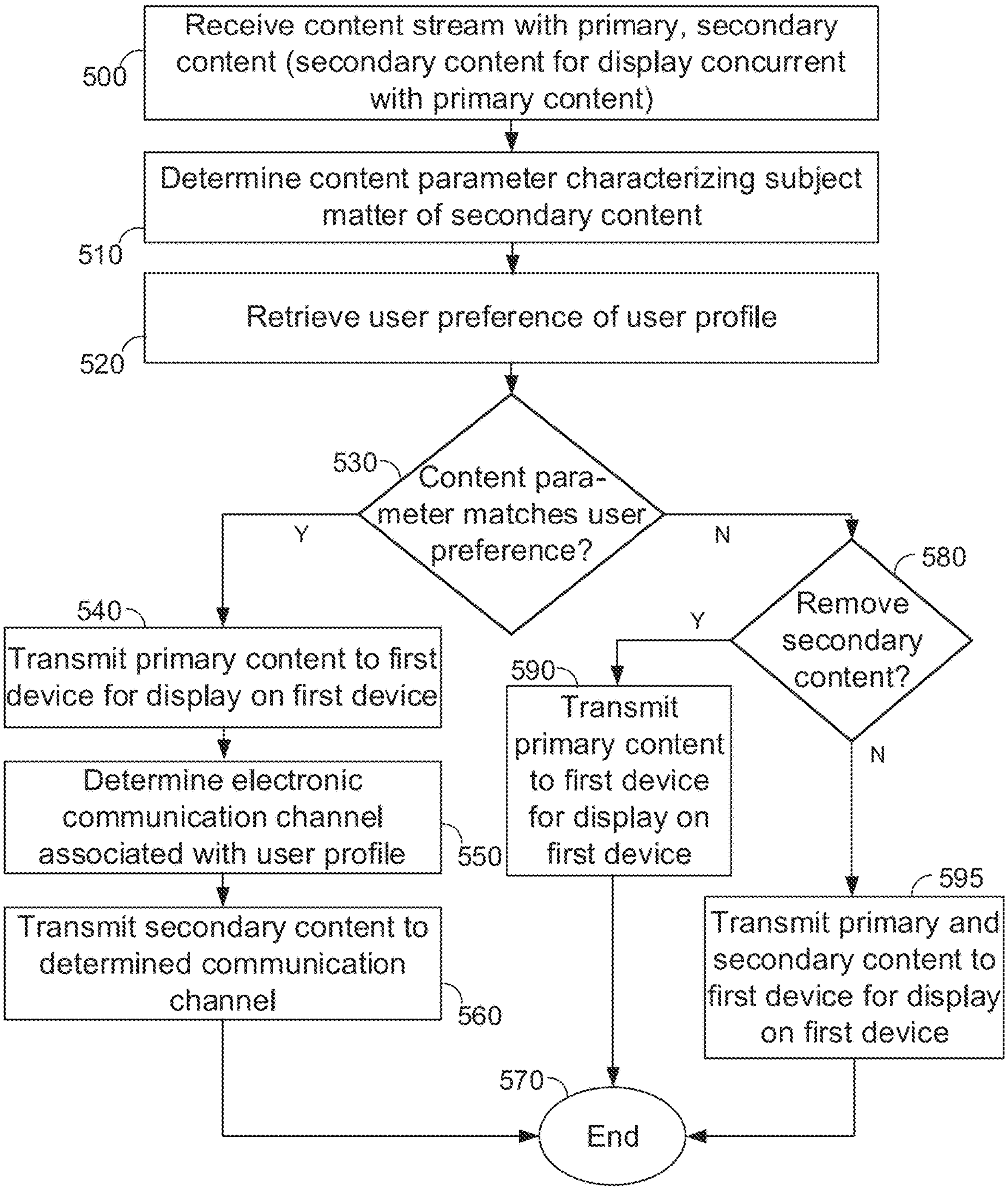
FIG. 5 is a flowchart illustrating process steps for redirecting portions of content to alternate communication channels.

FIG. 5 is a flowchart illustrating process steps for redirecting portions of content to alternate communication channels, in accordance with embodiments of the disclosure. Initially, content direction device 120 receives a content stream from a content provider 140, where this content stream has both primary and secondary content (Step 500). The primary content is a program for consumption by the viewer of device 110, 130, such as the primary image 10 of FIG. 1, while the secondary content can be any additional content for concurrent display with the primary content, such as the secondary image 20 or banner of FIG. 1.

The content direction device 120 then determines whether the secondary content is likely to be of interest to the viewer. To accomplish this, the content direction device 120 may determine a content parameter characterizing the subject matter of the secondary content (Step 510). Determination of this content parameter can be performed in any manner. For example, the content provider 140 may transmit both content and associated metadata to the content direction device 120. This metadata may include one or more keywords or terms characterizing the content, as well as associated information such as the names of actors or other performers, names of producers of the content, genres of the content, a content title, subtitles or close caption information, the name of the content provider, and the like. The content direction device 120 may also select any other information as the content parameter, such as one or more images of the content, a vocal or a facial characteristic of a performer in the content, a location in the content, an audio signature, and the like. The content direction device 120 may retrieve any such keywords or information from the metadata and employ them as the determined parameter. The content direction device 120 may also retrieve information from the content itself, such as images or audio signatures of the content, for use as the content parameter. Alternatively, the content direction device 120 may characterize the subject matter of the content received from content provider 140, by processes such as machine classification of content into specified genres. Techniques for performing such classification are known. Additionally, the content direction device 120 may determine whether the secondary content is of interest to the viewer in any other manner. Embodiments of the disclosure also contemplate simply transmitting all secondary content to viewers as messages, regardless of whether they may have a particular interest in such content.

Once the subject matter of the content is characterized by one or more parameters, the content direction device 120 retrieves a user preference of a user profile corresponding to the viewer of content (Step 520). More specifically, the content direction device 120 determines the identity of the viewer and retrieves a corresponding user profile listing preferences of the viewer. The content direction device 120 may determine the viewer's identity, for example, by parsing the viewer's login credentials when the viewer logs in to his or her subscriber account for the content provider 140 and comparing them to stored credentials associated with user profiles 418. Viewer identity may also be determined from other login credentials such as viewer logins to the content direction device 120, or communication channel accounts such as social media or other accounts. The content direction device 120 may also determine appropriate profiles in any other manner, such as by associating each device 110, 130 with one or more particular profiles and using those profiles when that device 110, 130 is consuming content from the content direction device 120. Embodiments of the disclosure contemplate determination of viewer identity in any manner. Once viewer identity is determined, the corresponding user profile is retrieved from the stored user profiles 418 or from another source, such as an external repository of user profiles accessed via communications network 210.

The content direction device 120 then assesses whether the content parameter determined in Step 510 matches user preferences of the user profile retrieved in Step 520 (Step 530). More specifically, the content parameter is compared to the user preferences listed in the profile of the viewer, to determine whether a match exists. As above, the content parameter may be any term characterizing the content, such as the primary genre of the content, the content title, the lead actor or actress, or the like, while the user profile may list user preferences of the same types, e.g., preferred actors, directors, genres, or the like. If the content parameter matches one of the preferences listed in the user profile, the process proceeds to transmit the primary content to a first device 110, 130, i.e. the device on which the viewer is consuming content, for display thereon (Step 540).

The secondary content is not transmitted for display with the primary content. Instead, it is transmitted to the viewer as a message. The content direction device 120 determines an electronic communication channel associated with the viewer's user profile (Step 550) and transmits the secondary content to this determined communication channel (Step 560). Determination of the appropriate electronic communication channel can be performed by, for example, storing the viewer's communication channel account information in his or her user profile 418, and retrieving the proper account information when a message is to be transmitted through that communication channel. The communication channels may be any electronic communication applications, such as social media accounts of the viewer, SMS numbers, electronic mail accounts, or the like. Thus, the user profiles 418 may store account information for channels such as viewers' Twitter® accounts, Facebook® Messenger accounts, text message numbers, or device 110, 130 alerts. The user profiles 418 may also store usage information for each account, indicating how often or how recently each account has been used. The content direction device 120 may then determine the most recently used or the most frequently used account, encapsulate the secondary content in a message for that application, and transmit the encapsulated message to that application via the appropriate communication channel interface 416.

Determination of the appropriate communication channel to use in Step 550 may be performed in any manner. As above, the most frequently used communication channel may be selected, or the most recently used channel may be selected. Alternatively, the user profiles 418 may contain user preferences for a particular channel, such as a channel previously selected by the user as his or her preferred channel. The messages may be sent via the appropriate channel, or appropriate application, to any device 110, 130. Thus, the messages may be sent to a different device than that to which the primary content is transmitted. The message may alternatively be sent to the same device, such as when a user is consuming primary content on his or her cellular phone and receives secondary content at his or her Twitter® account on the same phone.

Once the message is sent through the appropriate communication channel, the process terminates (Step 570).

If the content parameter does not match the user preferences of the user profile 418, the content direction device 120 determines whether to remove the secondary content from display to the viewer (Step 580), i.e., whether to transmit the secondary content through another communication channel, or to simply discard the secondary content so that the viewer does not see it. Secondary content can be removed based on any criteria. In one embodiment, secondary content can be removed based on its importance. For example, breaking news, warnings, alerts, and the like can be deemed sufficiently important to send to the viewer, whereas other secondary content can be deemed less important and discarded. As another example, secondary content can be removed based on the importance of the primary content. For instance, if the primary content sufficiently matches the viewer's preferred content, the viewer may be viewing content that he or she is very interested in. In this case, the viewer may not wish to be disturbed by any secondary content, regardless of the communication channel through which it is sent. In this case, secondary content can be discarded. Sufficiency of matching may be determined in any manner, such as by matching a predetermined number of preferences in the user profile 418. As still another example, secondary content can be removed based on user settings in user profiles 418. This allows viewers to set customized preferences for the type of secondary content they wish to see in a separate communication channel, or wish to have discarded instead.

If the content direction device 120 determines that the secondary content should be removed, only the primary content is transmitted to the viewer's device for display (Step 590), and the secondary content is discarded, whereupon the process terminates (Step 570). Alternatively, if the content direction device 120 determines that the secondary content should not be removed, e.g., if it is deemed of sufficient importance, the secondary content may be transmitted along with the primary content to the viewer in the conventional manner, for concurrent display on the viewer's device 110, 130 (Step 595). The process then terminates (Step 570).

Figure 6:
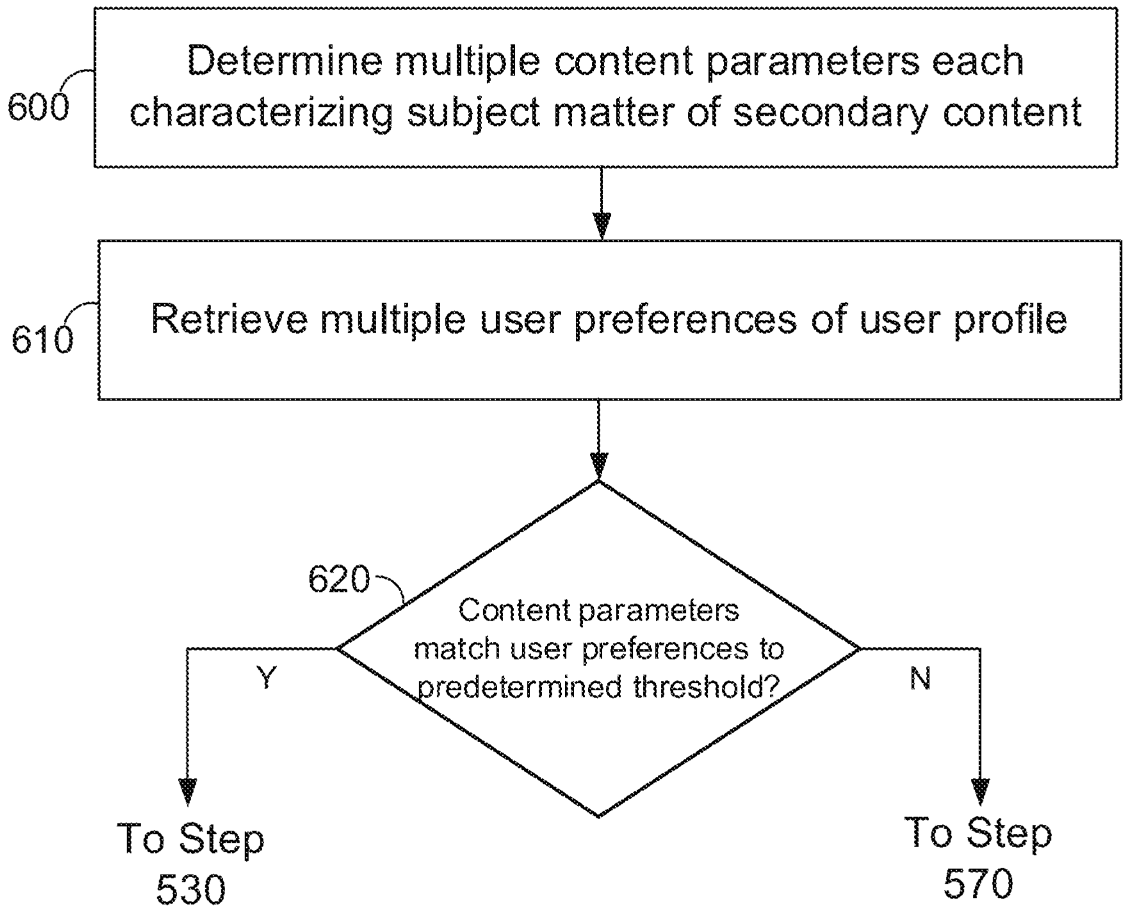
FIG. 6 is a flowchart illustrating process steps for using multiple content parameters to determine matches between content and a user profile.

While Step 510 describes determination of a single content parameter for characterizing the subject matter of the secondary content, it is noted that embodiments of the disclosure are not limited to use of only one parameter. Multiple parameters may be determined in Step 510, and the comparison to user profiles may be carried out with each of these multiple parameters. FIG. 6 is a flowchart illustrating process steps for using multiple content parameters to determine matches between content and a user profile. The process steps of FIG. 6 correspond to Steps 510-530 of FIG. 5. In the process of FIG. 6, the content direction device 120 begins by determining multiple content parameters each characterizing the subject matter of the secondary content (Step 600). This step is performed in similar manner to Step 510 of FIG. 5, except that multiple parameters are determined rather than just one. Step 510 may simply be repeated multiple times, so that each individual parameter is determined as previously described.

Multiple user preferences may then be retrieved from the user profile 418 (Step 610). As with Step 600, user preference retrieval may be performed as in Step 520 of FIG. 5, except that multiple user preferences are retrieved. Step 610 need not necessarily retrieve multiple user preferences and may retrieve only a single such preference, for instance, if only a single user preference is desired or if only a single user preference exists in user profile 418.

Once the content parameters are determined and user preferences are retrieved, the content direction device 120 determines whether the multiple content parameters match the multiple user preferences to at least a predetermined threshold (Step 620). Matching may be performed in any manner. As one example, a match may be deemed to occur upon a predetermined number of matches between content parameters and user preferences, where this predetermined number may be any number. Alternatively, a match may be deemed to occur upon matches to a predetermined subset of the determined content parameters. For instance, a match may be deemed to occur when the genre and subject name match, or when the content title and actor match. In this manner, the viewer of content may set his or her user profile preferences to send secondary content to their cellular phone (via social media account messages, etc.) when the secondary content concerns sports news containing the name of the viewer's favorite team, or when the secondary content contains news about the lead actor in the viewer's favorite television show. The predetermined threshold may be any threshold or criteria for determining whether a match occurs.

If no match is found, i.e., if the determined content parameters do not match the user preferences to the predetermined criteria, then the process proceeds to Step 570 of FIG. 5 and the secondary content is displayed on the viewer's device in conventional manner (or perhaps deleted). If a match is found though, then the process instead proceeds to Step 530 of FIG. 5, where the primary content is displayed on the viewer's device without the secondary content. The secondary content is instead transmitted to the viewer as a separate message, through one of the viewer's preferred communication channels.

Embodiments of the disclosure also employ feedback mechanisms to update the information in user profiles 418. As one example, once Step 530 determines a match between parameters of secondary content and user preferences, the parameters of the secondary content can be saved to the appropriate user profile 418 to keep the user profile 418 updated as to the user's latest viewed content, and thus his or her most recent content choices. In this manner, the viewer profiles may be continuously updated to reflect viewers' most recent content preferences.

As another example, once a communication channel is selected and a message is transmitted through that channel at Step 560, the corresponding user profile 418 can be updated to reflect the use of that communication channel. That is, an additional use of that particular communication channel can be logged in the user profile 418. In this manner, the user profiles are kept up to date as to which communication channels are most frequently or most recently used.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any one or more parameters may be employed to characterize the subject matter of secondary content, and these parameters may be compared to any type and number of user preferences. Furthermore, a match between these parameters and user preferences may be determined in any manner, by any one or more criteria. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:

receiving primary content and secondary content at a device;

determining that the secondary content is of interest to a user associated with the device;

identifying a plurality of communication channels associated with the user;

determining a selected communication channel of the plurality of communication channels as a medium to deliver the secondary content, wherein the selected communication channel is based at least in part on a channel relevance criteria;

receiving tertiary content at the device;

determining whether the tertiary content is more important than the secondary content; and based on determining that the tertiary content is more important than the secondary content, causing the tertiary content to be transmitted via the selected communication channel instead of the secondary content.

2. The method of claim 1, wherein the tertiary content comprises any one or more of breaking news, a warning, or an alert.

3. The method of claim 1, wherein the channel relevance criteria is based on at least one of a number of transmissions or information indicative of how recent a respective channel was used for transmission.

4. The method of claim 1, further comprising:

based on determining that the tertiary content is more important than the secondary content, causing the secondary content to be discarded.

5. The method of claim 1, wherein the selected communication channel comprises a short messaging service.

6. The method of claim 1, wherein the selected communication channel comprises an electronic mail.

7. The method of claim 1, wherein the selected communication channel comprises a social media account.

8. The method of claim 1, wherein determining that the secondary content is of interest to the user associated with the device comprises:

determining that the secondary content is associated with any one or more of a favorite sports team or a favorite sports event.

9. The method of claim 1, wherein determining that the secondary content is of interest to the user associated with the device comprises:

determining that the secondary content is associated with any one or more of a favorite actor or a favorite television show.

10. The method of claim 1, wherein the device is a first device and causing the tertiary content to be transmitted via the selected communication channel instead of the secondary content further comprises:

displaying the tertiary content on a second device different from the first device.

11. A system comprising memory and control circuitry configured to:

receive primary content and secondary content at a device;

determine that the secondary content is of interest to a user associated with the device;

identify a plurality of communication channels associated with the user;

determine a selected communication channel of the plurality of communication channels as a medium to deliver the secondary content, wherein the selected communication channel is based at least in part on a channel relevance criteria;

receive tertiary content at the device;

determine whether the tertiary content is more important than the secondary content; and based on determining that the tertiary content is more important than the secondary content, cause the tertiary content to be transmitted via the selected communication channel instead of the secondary content.

12. The system of claim 11, wherein the tertiary content comprises any one or more of breaking news, a warning, or an alert.

13. The system of claim 11, wherein the channel relevance criteria is based on at least one of a number of transmissions or information indicative of how recent a respective channel was used for transmission.

14. The system of claim 11, wherein the control circuitry is further configured to:

based on determining that the tertiary content is more important than the secondary content, cause the secondary content to be discarded.

15. The system of claim 11, wherein the selected communication channel comprises a short messaging service.

16. The system of claim 11, wherein the selected communication channel comprises an electronic mail.

17. The system of claim 11, wherein the selected communication channel comprises a social media account.

18. The system of claim 11, wherein the control circuitry, when determining that the secondary content is of interest to the user associated with the device, is configured to:

determine that the secondary content is associated with any one or more of a favorite sports team or a favorite sports event.

19. The system of claim 11, wherein the control circuitry, when determining that the secondary content is of interest to the user associated with the device, is configured to:

determine that the secondary content is associated with any one or more of a favorite actor or a favorite television show.

20. The system of claim 11, wherein the device is a first device and the control circuitry, when causing the tertiary content to be transmitted via the selected communication channel instead of the secondary content, is further configured to:

display the tertiary content on a second device different from the first device.

* * * * *